March 9, 1965  K. ROSENBAUM  3,172,798
WORK LOCATING FIXTURE AND SEALING DIE ASSEMBLY
Filed April 30, 1959  2 Sheets-Sheet 1

INVENTOR
KURT ROSENBAUM
BY
William R. Lieberman
ATTORNEY

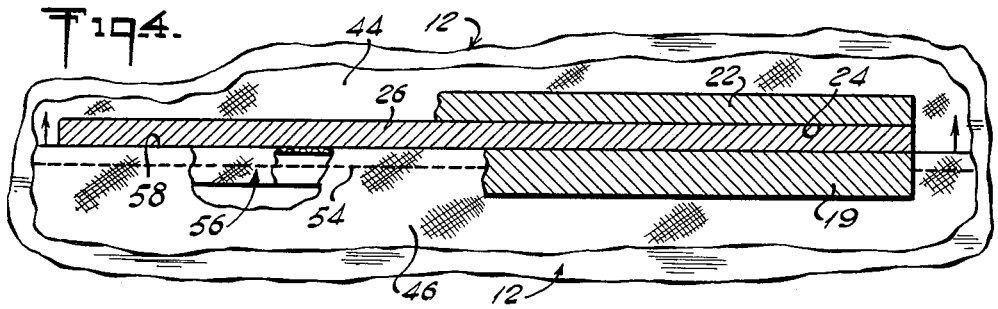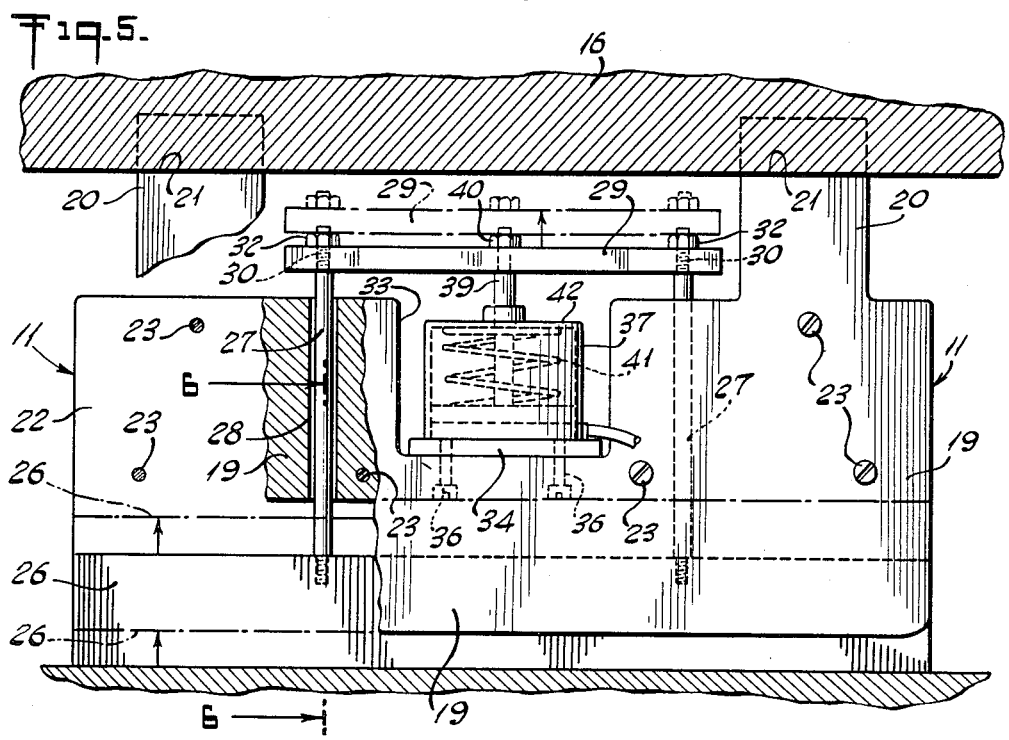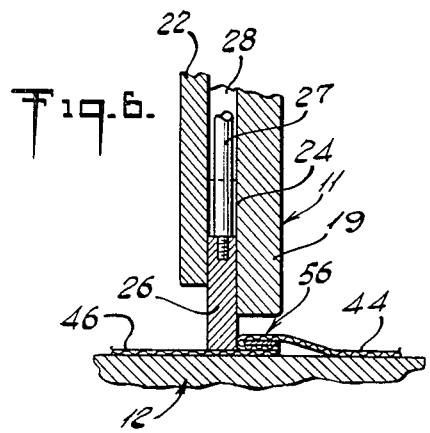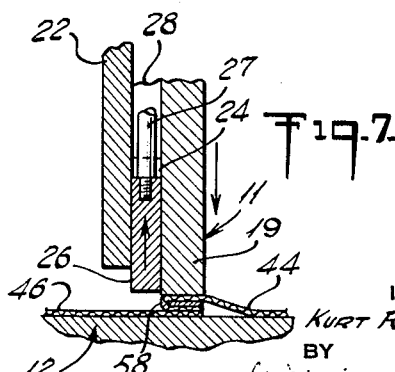

United States Patent Office 3,172,798
Patented Mar. 9, 1965

3,172,798
WORK LOCATING FIXTURE AND SEALING DIE ASSEMBLY
Kurt Rosenbaum, Spring Valley, N.Y., assignor to The B. F. Goodrich Company, Akron, Ohio, a corporation of New York
Filed Apr. 30, 1959, Ser. No. 810,045
9 Claims. (Cl. 156—380)

The present invention relates generally to an improved web joining and sealing apparatus, and in particular it relates to an improved apparatus for heat sealing a web along a curved seam, and particularly a seam curved in three dimensions and of varying contour.

The conventional top for convertible model automobiles and the like includes a top panel or deck portion and depending side panels, the deck and side panels being separately formed and joined along lines of varying curvature. It is essential that the seams joining the deck and the side panels be completely waterproof and that it be capable of withstanding the relatively high stresses attendant the application, fitting and use of the convertible top. Not only should the seams be phsyically capable of withstanding continuously varying stresses, but during the erection and collapsing of the top should also maintain its waterproof properties during use when it is subjected to all sorts of strains and stresses. The methods and apparatus heretofore employed in the fabrication of tops for convertible automobiles have been highly inefficient, being greatly time-consuming and requiring a high degree of skill with attendant high cost, and the results have often left much to be desired.

It is, therefore, a principal object of the present invention to provide an improved apparatus for joining webs.

Still another object of the present invention is to provide an improved apparatus for joining a pair of webs along a curved seam.

A further object of the present invention is to provide an improved apparatus for effecting a watertight curved seam between a pair of webs.

A still further object of the present invention is to provide an improved apparatus for producing a heat-sealed, watertight curved seam between a pair of webs, and particularly where said curvature varies along the length of the seam in three dimensions.

Another object of the present invention is to provide an improved apparatus for producing watertight seams characterized by the absence of exposed stitching.

Still another object of the present invention is to provide an improved apparatus for sealing a seam along successive increments thereof.

A further object of the present invention is to provide an improved apparatus for sealing seams of various configuraitons with the use of a single die.

Another object of the present invention is to provide an improved apparatus of the above nature characterized by its efficiency and its simplicity of use and application and the uniformly high quality of the end products.

The above and further objects of the present invention will become apparent from a reading of the following description, taken in conjunction with the accompanying drawings, wherein FIGURE 1 is a front perspective view, partially broken away and partly in section, of an improved apparatus embodying the present invention, illustrated as applied to the heat-sealing of a curved seam;

FIGURE 4 is a sectional view taken along line 4—4 of FIGURE 1;

FIGURE 5 is a fragmentary front elevational view of the improved apparatus;

FIGURE 6 is a sectional view taken along line 6—6 of FIGURE 5; and

FIGURE 7 is a view similar to FIGURE 6 with the sealing electrode illustrated in depressed position.

Figure 1:
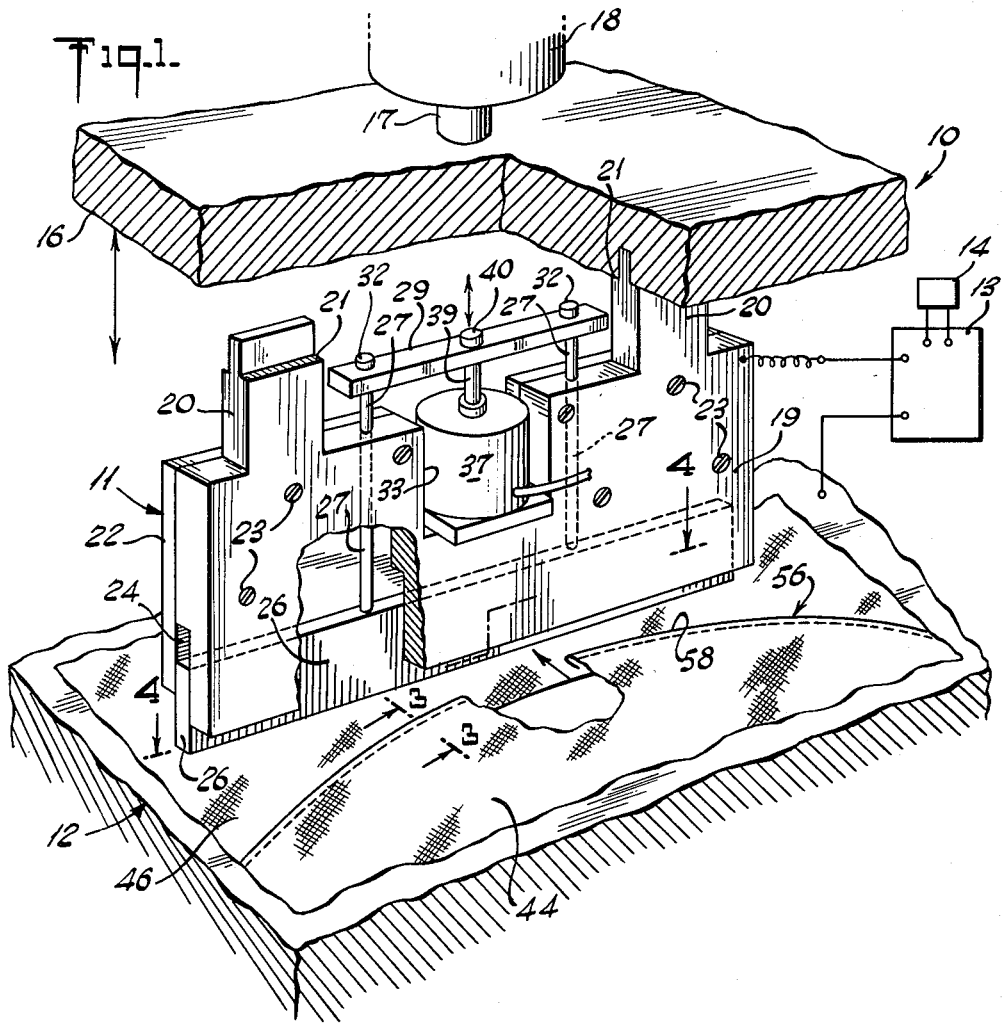
Figure 2:
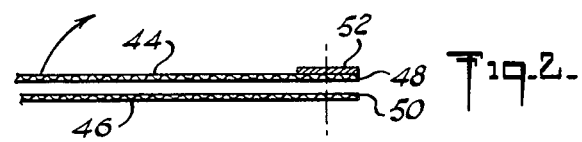
FIGURE 2 is a transverse sectional view of a pair of webs and a tape prior to the joining thereof.

In a sense, the present invention contemplates the provision of an improved apparatus for effecting the heat-sealing of a curved seam, the apparatus comprising a base plate, a work-guide member disposed above said base plate, and a heat-applying member movable between a raised and a depressed position with respect to said base plate and along said work guide member.

According to the preferred form of apparatus of the present invention, the heat-applying member and the base plate define first and second electrodes connected to a source of high frequency current by way of a switch and timing device. The first electrode is in the form of a vertical plate having an end underface confronting the second electrode, and movable vertically by way of an air cylinder. The guide is in the form of a bar carried and vertically movable along the rear face of the first electrode plate and it is spring-urged to a lower position wherein its bottom face is a short distance above the second electrode when the first electrode is in a raised position. Means are provided for raising the underface of the guide bar at least to the level of the underface of the first electrode when the latter is in depressed position.

The present improved method is generally practiced by superposing first and second heat sealable webs having coinciding edges extending along a curved line, securing the borders of the web along said curved edges and then inverting the uppermost web to form a hem. The hem is then drawn against a guide surface of lesser curvature by pulling the lower web, and heat and pressure applied to the assembled hem and border to effect the heat-sealing thereof.

Referring now to the drawings, which illustrate a preferred embodiment of the present invention, the reference numeral 10 generally designates the improved machine which includes a first vertically movable electrode 11 and a stationary metal base plate 12 defining a second electrode. Electrodes 11 and 12 are electrically separated and are connected in conventional manner to a high frequency electrical generator 13 which, in turn, is connected to and actuated by a switching and timing mechanism 14 of conventional construction. First electrode 11 is mounted in the underface of a vertically movable pressure plate 16 coupled to a piston rod 17 actuated by a double-acting pneumatic cylinder 18, the opposite ends of which are connected by way of a selectively operable three-way valve to a source of compressed air (not shown).

First movable electrode 11 includes a vertical, longitudinal extending metal plate 19 having a horizontal underface confronting the upper face of base plate 12, and provided with a pair of laterally spaced, upwardly directed arms 20. The upper portions of arms 20 are of reduced transverse cross-section, and firmly engage corresponding recesses in the underface of pressure plate 16, to effect the mounting and securement of first electrode 11, shoulders 21 at the base of the reduced portions abutting the underface of pressure plate 16. A plate 22 is secured to the rear face of plate 19 by means of screws 23, the lower edge of plate 22 being higher than the lower edge of plate 19. The rear lower edge of plate 19 is chamfered to provide a downwardly-facing longitudinally extending groove 24 between plates 19 and 22.

Vertically slidably engaging groove 24 is a longitudinally extending guide bar 26 having a horizontally extending downwardly directed underface. A pair of longitudinally spaced, vertical support rods 27 slidably register with vertical guide bores 28 formed in plate 19, rods 27 having lower threaded ends engaging corresponding tapped bores formed in the upper edge of guide bar 26. A cross-piece 29 has vertically extending apertures formed in the opposite ends thereof, which engage the threaded upper ends 30 of rods 27 and rest upon the shoulder formed at the bases of threaded ends 30. Nuts 32 likewise engage the threaded ends 30 to lock cross-piece 29 to rods 27.

Medially located coinciding rectangular recesses 33 are formed in the upper portions of plates 19 and 22. A horizontal support plate 34 rests on the bases of the recesses 33, and is suitably secured thereby by screws 36. A vertically extending, pneumatic cylinder 37 is mounted on base plate 34 and is provided with a piston 38, having an upwardly directed piston rod 39. The upper end of piston rod 39 is threaded and projects through a corresponding opening formed in cross-piece 29. Cross-piece 29 is embraced between a peripheral shoulder at the base of the threaded end of piston rod 39 and a nut 40 engaging said threaded end and locking piston rod 39 to the cross-piece 29. A helical compression spring 41 is located in cylinder 37, registering with piston rod 39 and entrapped between the confronting upper face of piston 34 and the underface of the top wall 42 of the cylinder normally to urge piston 38, cross-piece 29 and guide bar 26 to their lowermost position relative to the first electrode. The lower end of cylinder 37 and the upper end of cylinder 18 are connected to a source of compressed air by way of suitable valves (not shown) in any well known manner, so that cylinder 37 is vented to the atmosphere when the first electrode 11 is in its raised position whereby guide bar 26 is urged by spring 41 to its lowermost position and, upon the introduction of compressed air into the upper end of cylinder 18 to depress the first electrode 11, compressed air is introduced into cylinder 37 in such timed relationship that the guide bar does not move substantially upwardly relative to base plate 12 until plate 19 reaches its lowermost position. This has been suitably achieved merely by air-interconnecting the upper end of cylinder 18 and cylinder 37. Furthermore, switch 14 is so locked with the first electrode 11 in any suitable manner so as to be capable of closing upon electrode 11 being in its depressed position.

It should be noted that the various components of the first electrode 11 are so dimensioned that when plate 19 is in its lowermost position it substantially contacts base plate 12, the confronting faces of plates 19 and 12 being substantially parallel, particularly along their lengths. The underface of guide bar 26, when plate 19 is raised, is to advantage and preferably at or slightly higher than the underface of plate 19. When plate 19 is in its raised position and guide bar 26 in its lowermost position relative thereto, the underface of guide bar 26 should be above the top face of base plate 12 a distance between approximately the thickness of the bottom web being sealed and approximately four times said thickness, the purpose of which will be hereinafter apparent. When the term "a short distance between the guide bar and base plate" is referred to in the claims, the above distance is meant.

Considering now the application and operation of the apparatus described above, and the practice of the present improved process, a first web 44 is superimposed upon a second web 46, webs 44 and 46 having concave edges 48 and 50 respectively in substantial coincidence. The configuration of the web edges 48 and 50 depends on the desired end product, and they are shaped in a manner well known in the art. Webs 44 and 46 are preferably formed of a heat-sealable material and in the fabrication of tops for convertible automobiles may be formed of a fabric woven of cotton or rayon yarn impregnated with a synthetic organic thermoplastic resin, or woven of synthetic organic thermoplastic fibers or filaments. Overlying the border of the first web 44 and disposed along the curved edge 48 thereof is a band or tape 52, preferably formed of a heat-sealable material, tape 52 and the curved borders of webs 44 and 46 being sewn together by a line of stitches 54. Thereafter, the first web 44 is inverted or folded back about the inner edge of tape 52 to form a hem 56, the confronting faces of which embrace and sandwich tape 52 and having a rearwardly directed folded edge 58. In the case of tops for convertible automobiles, hem 56 and the underlying border of the web 46 lie along a three dimensional curve of varying degrees of curvature.

Figure 3:
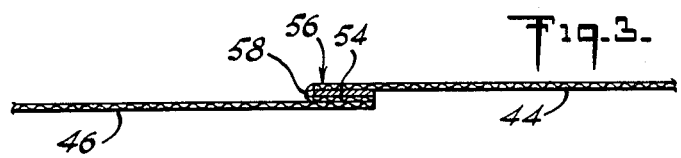
FIGURE 3 is a sectional view taken along line 3—3 of FIGURE 1.

Webs 44 and 46, disposed and assembled as illustrated in FIGURE 3 of the drawings are laid on base plate 12 with first electrode 11 in raised position and with guide bar 26 in depressed position, as illustrated in FIGURES 1 and 6 of the drawings. The second web 46 extends rearwardly along base plate 12 and is located between the confronting faces of base plate 12 and guide bar 26, and the folded hem edge 58 is located forward of the guide bar 26. The operator, standing along the rear of the apparatus, pulls the second web rearwardly toward him until the folded hem edge 58 substantially abuts the forward face of guide bar 26 and the hem 56, tape 52 and the underlying border of the web 46 being in vertical alignment with the underface of plate 19. The first electrode 11 is then depressed and the guide bar 26 raised in the manner earlier set forth to apply pressure to the assembled hem 56, tape 52 and the border of the web 46, as in FIGURE 7, and the switch 14 is thereafter closed for a predetermined interval to apply a high frequency current to the assembly, effecting the dielectric heating and fusion thereof in well known fashion. Electrode 11 and guide bar 26 are returned to their original raised and depressed positions respectively, and the webs 44 and 46 are slid longitudinally along the base plate 12 until the next successive length of hem is brought into registry with the electrode 11 whereupon the above procedure is repeated. Successive end to end, preferably overlapping lengths of the assembled web borders are treated in the above manner until the full length of the seam has been treated and thus sealed and joined in a watertight state.

In the production of convertible automobile tops, a first electrode 11 having a length of about ten inches and overlapping the pressure and heating applications along the length of the seam about one-half inch have proven highly satisfactory.

While there have been described and illustrated preferred embodiments of the present invention, it is apparent that numerous alterations, additions and omissions may be made without departing from the spirit thereof.

I claim:

1. An improved apparatus of the character described, comprising a first electrode defining a base plate, a longitudinally extending guide bar having an underface confronting said base plate and normally closely spaced therefrom and a second electrode having an underface confronting said first electrode and movable between a raised and depressed position with respect to said first electrode along a path passing adjacent the forward edge of said guide bar, and means operable on movement of the second electrode into its depressed position to displace the guide bar from its normal position relative to the first electrode.

2. An improved apparatus for effecting the heat-sealing of a pair of webs comprising a base plate defining a first electrode, said plate having an upwardly directed face, a second elongated electrode vertically movable to and from said first electrode between a raised and depressed position and having an underface confronting the upwardly directed face of said first electrode and provided with a rear edge, and a guide bar to locate the webs to be sealed between the first and second electrodes, said guide bar being vertically movable relative to said second electrode along said rear edge and having an underface confronting said first electrode, said guide bar disposed a short distance above said first electrode when said second electrode is in raised position, and vertically displaced from said first electrode when said second electrode is in depressed position.

3. An improved heat-sealing apparatus of the character described, comprising a first electrode-defining base plate having an upwardly directed face, a second linearly longitudinally extending electrode vertically movable to and from said first electrode between a raised and a depressed position and having an underface confronting the upwardly directed face of said first electrode, a guide bar having a linearly longitudinally extending underface confronting said first electrode and vertically movable along the rear face of said second electrode between a relatively raised and a normal depressed position projecting below said second electrode, and means urging said guide bar to its relatively raised position against its normal biasing when said first electrode is in its depressed position.

4. An improved apparatus in accordance with claim 3, wherein the underface of said guide bar is at least substantially at the level of said second electrode underface when said second electrode is in depressed position.

5. An improved heat-sealing apparatus of the character described, comprising a first electrode-defining base plate having an upwardly directed face, a second linearly longitudinally extending electrode vertically movable to and from said first electrode between a raised and a depressed position and having an underface confronting the upwardly directed face of said first electrode, a guide bar having a linearly longitudinally extending underface confronting said first electrode and vertically movable along the rear face of said second electrode between a relatively raised and a depressed position, projecting below said electrode in the depressed position, spring means normally urging said guide bar to its relatively depressed position, and means relatively raising said guide bar upon the depression of said second electrode.

6. An improved heat-sealing apparatus of the character described, comprising a first electrode-defining base plate having an upwardly directed face, a second electrode-defining vertical first plate having a rearwardly directed face and a bottom end face confronting said first electrode upper face, means selectively reciprocating said second electrode between a raised and a depressed position, a guide-defining second plate vertically slidable along said first plate rear face between a relatively raised position and a depressed position projecting below said second electrode bottom face, and means normally urging said guide plate to its depressed position.

7. An improved heat-sealing apparatus in accordance with claim 6, wherein the bottom face of said guide plate is disposed a short distance above said base plate when said second electrode is in raised position and said guide plate is in its depressed position.

8. An improved heat-sealing apparatus in accordance with claim 6, wherein the underface of said guide plate is disposed at least at the level of said second electrode underface when said guide plate is in raised position.

9. A work locating fixture and sealing die assembly for an electronically-operated heat sealing machine adapted to bond together a plurality of layers of thermoplastic material, comprising a metallic die element movable in a straight line and adapted to sandwich together the layers to be sealed, a work locating tongue positioned adjacent the die element and slidably movable in a direction parallel to the direction of movement of said die element, means for exerting pressure on said tongue to cause one end of said tongue to extend beyond the sealing surface of said die element, and means linked to one end of said tongue and operable with movement of said die element in the direction for sandwiching and sealing said layers together for slidably retracting said tongue away from the thermoplastic material to be bonded to cause the outermost extended surface thereof to lie in substantially the same plane as the sealing surface of said die element.

References Cited by the Examiner

UNITED STATES PATENTS

| | | | |
|---|---|---|---|
| 2,390,550 | 12/45 | Moore | 154—42 |
| 2,401,991 | 6/46 | Walton | 154—42 |
| 2,402,298 | 6/46 | Salfisbery | 154—42 |
| 2,405,675 | 8/46 | Southwick. | |
| 2,680,087 | 6/54 | Sundback | 154—116 |
| 2,804,419 | 8/57 | De Woskin | 154—116 |
| 2,936,816 | 5/60 | Lang | 154—42 |

EARL M. BERGERT, *Primary Examiner.*

CARL F. KRAFTT, *Examiner.*